United States Patent
Marcu et al.

(10) Patent No.: US 10,672,363 B2
(45) Date of Patent: Jun. 2, 2020

(54) COLOR RENDERING FOR IMAGES IN EXTENDED DYNAMIC RANGE MODE

(71) Applicant: Apple Inc., Cupertino, CA (US)

(72) Inventors: Gabriel Marcu, San Jose, CA (US); Ian C. Hendry, San Jose, CA (US); Jean-François Mulé, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/146,714

(22) Filed: Sep. 28, 2018

(65) Prior Publication Data
US 2020/0105221 A1 Apr. 2, 2020

(51) Int. Cl.
| | |
|---|---|
| G09G 5/02 | (2006.01) |
| G09G 5/00 | (2006.01) |
| G06T 11/00 | (2006.01) |
| H04N 1/60 | (2006.01) |
| H04N 5/57 | (2006.01) |
| H04N 5/58 | (2006.01) |
| H04N 9/73 | (2006.01) |
| G06T 5/00 | (2006.01) |

(52) U.S. Cl.
CPC .......... *G09G 5/02* (2013.01); *G06T 5/009* (2013.01); *G06T 2207/10024* (2013.01); *G06T 2207/20208* (2013.01); *G09G 2320/0242* (2013.01); *G09G 2320/0666* (2013.01); *G09G 2354/00* (2013.01); *G09G 2360/144* (2013.01)

(58) Field of Classification Search
CPC combination set(s) only.
See application file for complete search history.

(56) References Cited

U.S. PATENT DOCUMENTS

| | | |
|---|---|---|
| 6,160,655 A | 12/2000 | Fix |
| 6,987,519 B2 | 1/2006 | Kumada |
| 8,243,210 B2 | 8/2012 | Bing |

(Continued)

FOREIGN PATENT DOCUMENTS

WO 2016026072 A1 2/2016

OTHER PUBLICATIONS

Marcu, Gabriel, "Gamut Mapping in Munsell Constant Hue Sections", The Sixth Color Imaging Conference: Color Science, Systems, and Applications, pp. 159-162 (1998).

(Continued)

*Primary Examiner* — Wesner Sajous
(74) *Attorney, Agent, or Firm* — Blank Rome LLP

(57) ABSTRACT

Pixel values of image content are lowered in response to setting a display mode so that the lowered pixel values of the first image content are mapped to a first color gamut. The first color gamut is defined by a nominal range space and is lower than a native color gamut of a display panel. The native color gamut is defined by the nominal range space and an extended range space that is outside of the first color gamut. One or more parameters are obtained for the image content in the display mode. A color boosting operation is performed for, from among the lowered pixel values of the image content in the nominal range space, each of first pixel values that meet one of the parameters. A color associated with each of the first pixel values is proportionally enhanced without changing a corresponding hue to utilize the extended range space.

25 Claims, 7 Drawing Sheets

(56) References Cited

U.S. PATENT DOCUMENTS

| | | |
|---|---|---|
| 8,704,859 B2 | 4/2014 | Greenebaum |
| 8,954,263 B2 | 2/2015 | Geelen |
| 9,224,363 B2 | 12/2015 | Ballestad |
| 9,530,342 B2 | 12/2016 | Bell |
| 9,583,035 B2 | 2/2017 | Buckley |
| 10,007,977 B2 | 6/2018 | Aaron |
| 10,043,251 B2 | 8/2018 | Huang |
| 2002/0180751 A1 | 12/2002 | Rozzi |
| 2004/0008208 A1 | 1/2004 | Dresevic |
| 2005/0117186 A1 | 6/2005 | Li |
| 2006/0284895 A1 | 12/2006 | Marcu |
| 2008/0080047 A1 | 4/2008 | Field |
| 2008/0165292 A1 | 7/2008 | Bing |
| 2008/0303918 A1 | 12/2008 | Keithley |
| 2009/0141039 A1* | 6/2009 | Ramanath ............. G09G 3/346 345/590 |
| 2010/0079426 A1 | 4/2010 | Pance |
| 2010/0124363 A1 | 5/2010 | Ek |
| 2010/0275266 A1 | 10/2010 | Jakobson |
| 2011/0074803 A1 | 3/2011 | Kerofsky |
| 2011/0141366 A1 | 6/2011 | Yoon |
| 2011/0285746 A1* | 11/2011 | Swic ....................... G09G 5/02 345/597 |
| 2011/0298817 A1 | 12/2011 | Oshinome |
| 2013/0071022 A1* | 3/2013 | Jia ........................... H04N 9/67 382/166 |
| 2013/0093783 A1* | 4/2013 | Sullivan .................. G09G 5/06 345/601 |
| 2014/0082745 A1 | 3/2014 | Guedalia |
| 2014/0333660 A1* | 11/2014 | Ballestad ................ G09G 5/00 345/593 |
| 2015/0221250 A1* | 8/2015 | Tada .................... G09G 3/2092 345/690 |
| 2016/0110846 A1 | 4/2016 | Park |
| 2016/0358346 A1 | 12/2016 | Hendry |
| 2016/0358584 A1* | 12/2016 | Greenebaum ........... G09G 5/02 |
| 2017/0116963 A1 | 4/2017 | Wanat |
| 2017/0161882 A1 | 6/2017 | Mantiuk |
| 2018/0152686 A1 | 5/2018 | Wozniak |

OTHER PUBLICATIONS

Moroney, Nathan, et al., "The CIECAM02 Color Appearance Model", IS&T/SID Tenth Color Imaging Conference, pp. 23-27 (2002).

* cited by examiner

COLOR RENDERING FOR IMAGES IN EXTENDED DYNAMIC RANGE MODE

BACKGROUND

This disclosure relates generally to color rendering of images, and more particularly, to perceptually enhancing the dynamic range and gamut of image content not only in luminance but also in color by utilizing an extra luminance range that is higher than a luminance of white of a display.

In digital image and video processing, conventionally, digital images (e.g., video or still images) are captured, rendered, and displayed at a limited dynamic range, referred to as standard dynamic range (SDR) imaging. High dynamic range (HDR) imaging refers to technology and techniques that capture, represent, or reproduce a wider range of luminance in electronic images (e.g., as displayed on display screens or devices) than is obtained using standard digital imaging technology and techniques. Many new devices such as image sensors and displays support HDR imaging. These devices may be referred to as HDR-enabled devices or HDR devices. At the same time, many display devices may not directly support HDR imaging. These devices may be referred to as standard displays or SDR displays. It may be desirable to increase the perceived dynamic range and gamut of content in luminance and color displayed on SDR and HDR displays.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method includes: setting a display mode for first image content responsive to a condition being satisfied; lowering each of a plurality of pixel values of the first image content in response to setting the display mode such that the lowered plurality of pixel values of the first image content are mapped to a first color gamut, wherein the first color gamut is defined by a nominal range space and is lower than a native color gamut of a display panel, and wherein the native color gamut is defined by the nominal range space and an extended range space that is outside of the first color gamut; obtaining a first parameter and a second parameter for the first image content; and performing a color boosting operation for, from among the lowered plurality of pixel values of the first image content in the nominal range space, each of first pixel values that meet the first parameter, wherein a color associated with each of the first pixel values is proportionally enhanced without changing a corresponding hue in the color boosting operation to utilize the extended range space of the native color gamut of the display panel, wherein the color boosting operation enhances, for each of the first pixel values that meet the first parameter, a corresponding saturation value while maintaining a corresponding color balance, and wherein a degree of enhancement of the color associated with each of the first pixel values in the color boosting operation is set based on the second parameter for the first image content.

In another embodiment, the method may be embodied in computer executable program code and stored in a non-transitory storage device. In yet another embodiment, the method may be implemented on a system.

BRIEF DESCRIPTION OF THE DRAWINGS

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

Figure 1:
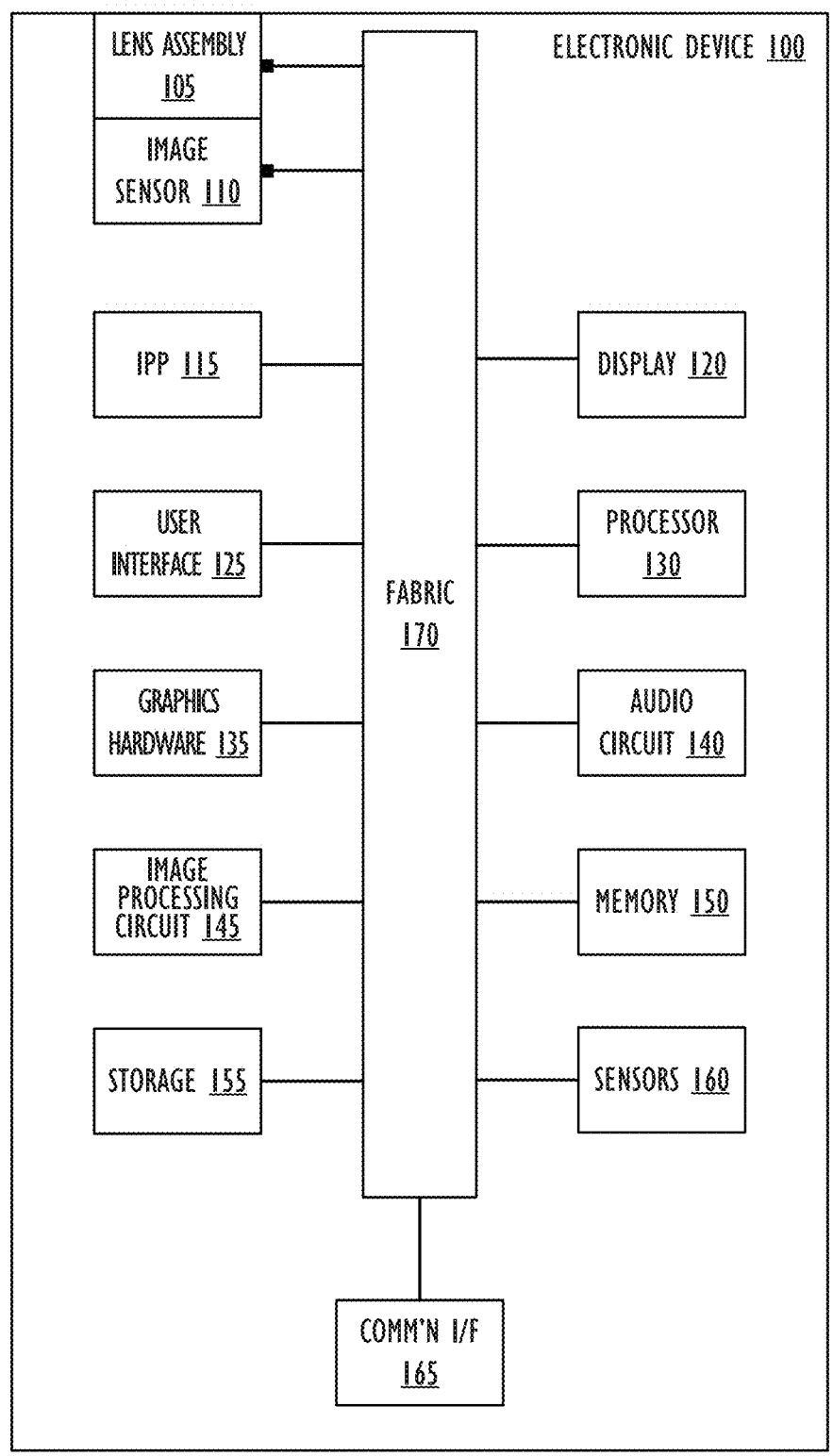
FIG. 1 shows, in block diagram form, a simplified functional block diagram of an illustrative electronic device, in accordance with one or more embodiments.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of signal processing having the benefit of this disclosure.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

This disclosure pertains to improving color rendering of images on displays in an extended dynamic range (EDR) mode. A system may detect ambient light levels and viewing conditions a user is adapted to by using one or more sensors. Based on the detected user adaptation levels (or based on a user setting operation or another predetermined condition (e.g., availability of a wide gamut display with a gamut wider than that of the image content)), the system may set one or more display characteristics (e.g., white point, black point, gamma, brightness, tone mapping, and the like) of a display panel so as to set a white luminance value (e.g., current white point, less than 100% luminance or brightness) of the display panel to be lower than the maximum luminance value of white (e.g., native or target white point, 100% luminance or brightness) the display panel. For example, in low luminance light conditions, the system may reduce the white luminance value to a level that may comfortably be accepted as white by the user after adaptation to the viewing conditions. To reduce the white luminance value, the system may set or modify a transfer function (e.g., linear or non-linear input-output curve, tone mapping curve, electro-optic transfer function, one or more look up tables (LUTs) and the like), to create an extended range space between the reduced luminance value of white and the maximum luminance value of the display panel. An EDR color gamut (e.g., color volume) of the display panel defined based on the lowered luminance value of white may define a nominal range space and may be narrower that the native color gamut of the display panel based on the maximum luminance value.

The modified transfer function may be applied to pixel values of image content to map (warp) the content to the nominal range space by manipulating pixel data in the rendering pipeline. Alternately, the modified transfer function may directly control the display panel to adjust output intensity values for one or more color channels by being implemented as electro-optical curves. In one embodiment, based on the modified transfer function associated the reduced white luminance value, the system may (in effect) proportionally lower pixel values of image content to be displayed in the EDR mode (e.g., display mode). The system may then take advantage of the extended range space created between the low luminance white and the maximum luminance of the display to perceptually increase the dynamic range and gamut of selected content not only in luminance (e.g., "brighter than white" content like specular reflections, high luminance sunlight spots, explosions, and the like) but also in color (e.g., boosted or more vivid colors).

In one embodiment, in the EDR mode, the system may accept input of one or more parameters from a user. The parameters may specify a region or range of image content (e.g., hue range, spatial or geometric range, and the like) that is to be rendered in a higher dynamic range than the remainder of the image content. The parameters may also specify a degree (e.g., level or intensity) of enhancement or boosting of the region or range of the image content. Based on the input parameters, the system may perform a color boosting operation in which the transfer function is modified so that the specified region or range of the image content may be rendered (or directly displayed) in a higher dynamic range (and/or perceptually wider gamut) so as to utilize the extended range space defined by the difference between the native color gamut and the EDR color gamut of the display panel.

In some embodiments, instead of lowering pixel values for all of the image content (e.g., image pixels) based on the transfer function associated with the reduced and user adapted luminance value of white, the color boosting operation may attenuate less the pixel values for the specified region or range (e.g., certain selected hues) of the image content, based on the specified parameters, so to have the "visual effect" of boosting the colors (and luminance) corresponding to the specified region or range of the image content. The "less attenuated" pixel values may extend outside the EDR color gamut of the display panel and into the (wider) native color gamut. Thus, by taking advantage of the extended range space, the system may improve the handling of color in EDR mode and induce the experience of more vivid colors (e.g., brighter or more saturated colors of the same corresponding hue) that in some conditions may be perceived as rendered in an enhanced color gamut that is wider that the perceptual color gamut the user is adapted to, even if the colors are rendered without any alteration to the native color gamut of the display. To produce this effect, the selected colors may be boosted to be in the extended range space of the native color gamut of the display panel, outside the EDR color gamut corresponding to the reduced white luminance value based on current user adaptation levels. This color boosting effect may enhance color and create more pleasing and eye catching effect for images in different applications (e.g., photo rendering applications). Further, since the selected colors are boosted by going along existing transfer function curves for multiple color channels (e.g., red, green, and blue channels), the corresponding hues are preserved, thereby maintaining the naturalness of the image and the color balance between the RGB color channels.

Referring to FIG. 1, a simplified functional block diagram of illustrative electronic device 100 capable of rendering text and other information onto an image or video sequence is shown according to one or more embodiments. Electronic device 100 could be, for example, a mobile telephone, personal media device, a notebook computer system, a tablet computer system, or a desktop computer system. As shown, electronic device 100 may include lens assembly 105 and image sensor 110 for capturing images of a scene such as an HDR video. In addition, electronic device 100 may include image processing pipeline (IPP) 115, display element 120, user interface 125, processor(s) 130, graphics hardware 135, audio circuit 140, image processing circuit 145, memory 150, storage 155, sensors 160, communication interface 165, and communication network or fabric 170.

Lens assembly 105 may include a single lens or multiple lens, filters, and a physical housing unit (e.g., a barrel). One function of lens assembly 105 is to focus light from a scene onto image sensor 110. Image sensor 110 may, for example, be a CCD (charge-coupled device) or CMOS (complementary metal-oxide semiconductor) imager. Device 100 may include more than one lens assembly and more than one image sensor. Each lens assembly may focus light onto a single image sensor (at the same or different times) or different portions of a single image sensor.

IPP 115 may process image sensor output (e.g., RAW image data from sensor 110) to yield a HDR image, image sequence or video sequence. More specifically, IPP 115 may perform a number of different tasks including, but not be limited to, black level removal, de-noising, lens shading correction, white balance adjustment, demosaic operations, and the application of local or global tone curves or maps. IPP 115 may also perform color rendering in EDR mode according to one or more embodiments. IPP 115 may comprise a custom designed integrated circuit, a programmable gate-array, a central processing unit (CPU), a graphical processing unit (GPU), memory or a combination of these elements (including more than one of any given element; non-transitory program storage device; programmable control device). Some functions provided by IPP 115 may be implemented at least in part via software (including firmware).

Display element (e.g., display device, display panel, or display) 120 may be an standard gamut (SDR) or wide gamut (HDR) display and may be used to display text and graphic output as well as receiving user input via user interface 125. User interface 125 can also take a variety of other forms such as a button, keypad, dial, a click wheel, and keyboard. For example, display element 120 may be a touch-sensitive display screen. Display element 120 may be based on any display technology like LCD, OLED, plasma, DLP, quantum dots, and the like.

Processor 130 may be a system-on-chip (SOC) such as those found in mobile devices and include one or more dedicated CPUs and one or more GPUs. Processor 130 may be based on reduced instruction-set computer (RISC) or complex instruction-set computer (CISC) architectures or any other suitable architecture and each computing unit may include one or more processing cores. Graphics hardware 135 may be special purpose computational hardware for processing graphics and/or assisting processor 130 perform computational tasks. In one embodiment, graphics hardware 135 may include one or more programmable GPUs each of which may have one or more cores. Audio circuit 140 may include one or more microphones, one or more speakers and one or more audio codecs. Image processing circuit 145 may aid in the capture of still and video images from image sensor 110 and include at least one video codec. Image processing circuit 145 may work in concert with IPP 115, processor 130 and/or graphics hardware 135.

Images, once captured, may be stored in memory 150 and/or storage 155. Memory 150 may include one or more different types of media used by IPP 115, processor 130, graphics hardware 135, audio circuit 140, and image processing circuitry 145 to perform device functions. For example, memory 150 may include memory cache, read-only memory (ROM), and/or random access memory (RAM). Storage 155 may store media (e.g., audio, image and video files), computer program instructions or software, preference information, device profile information, and any other suitable data. Storage 155 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Device sensors 160 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor.

Communication interface 165 may be used to connect device 100 to one or more networks. Illustrative networks include, but are not limited to, a local network such as a universal serial bus (USB) network, an organization's local area network, and a wide area network such as the Internet. Communication interface 165 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 170 may be comprised of one or more continuous (as shown) or discontinuous communication links and be formed as a bus network, a communication network, or a fabric comprised of one or more switching devices (e.g., a cross-bar switch). In general, one or more of processor 130, graphics hardware 135 and image processing circuit 145 may be configured to render selected information (textual or graphic) in a designated or specified region within an image or frame.

Figure 2:
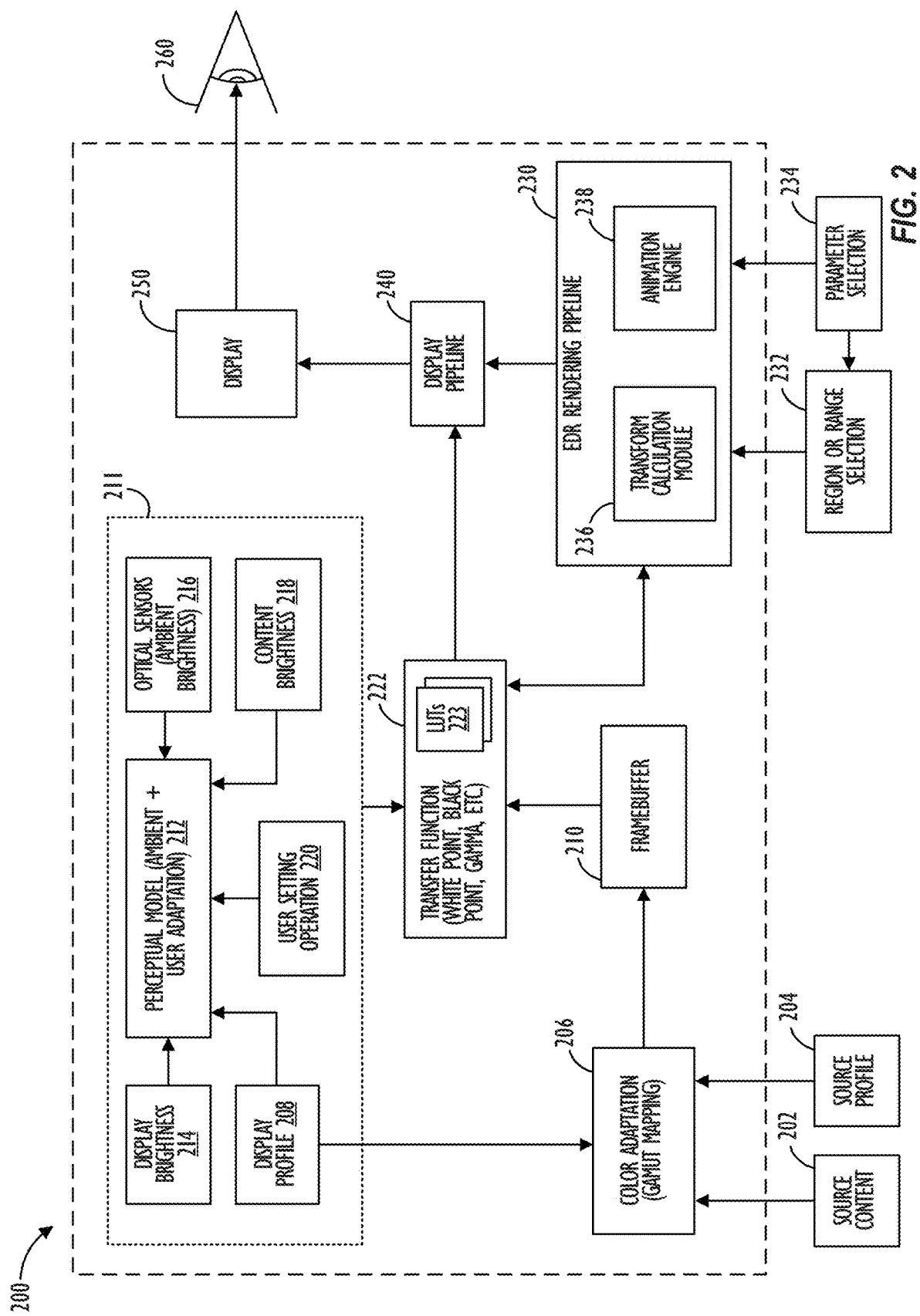
FIG. 2 shows a system for performing color rendering in extended dynamic range (EDR) mode, in accordance with one or more embodiments.

Referring now to FIG. 2, system 200 for performing improved color rendering in extended dynamic range (EDR) mode is illustrated, in accordance with one or more embodiments. Element 202 represents source content, created by, e.g., a source content author, that viewer 260 wishes to view. Source content 202 may comprise an image, video, or other displayable content type. Source content 202 may be content stored in memory and consumed by system 200 for post-processing. Alternately, source content 202 may be any of a live preview stream output from an image sensor in real time, a stream from a network (e.g., Internet), a stream from an optical disk, or any other source. System 200 for performing improved color rendering in EDR mode may be applied to any type of source content 202 regardless of the producer of the source of bits.

Element 204 may represent the source profile, that is, information describing the color profile and display characteristics of the device on which source content 202 was authored by the source content author. Source profile 204 may comprise, e.g., an ICC profile of the author's device or color space or other related information, and may indicate the rendering intent of source content 202. The ICC profile is a set of data that characterizes a color input or output device, or a color space, according to standards promulgated by the International Color Consortium (ICC). ICC profiles may describe the color attributes of a particular device or viewing requirement by defining a mapping between the device source or target color space and a profile connection space (PCS), usually the CIE XYZ color space. ICC profiles may be used to define a color space generically in terms of three main pieces: 1) the color primaries that define the gamut; 2) the transfer function (sometimes referred to as the gamma function); and 3) the white point. ICC profiles may also contain additional information to provide mapping between a display's actual response and its "advertised" response, i.e., its tone response curve (TRC).

Information relating to source content 202 and source profile 204 may be sent to viewer 260's device containing the system 200 for user adaptation, color rendering in EDR mode, and display on display 250. Viewer 260's device (e.g., device 100 of FIG. 1) may comprise, for example, a mobile phone, PDA, HMD, monitor, television, or a laptop, desktop, or tablet computer. In one embodiment, system 200 may be implemented using one or more components of electronic device 100 of FIG. 1 including IPP 115, user interface 125, graphics hardware 135, image processing circuit 145, storage 155, display 120, processor 130, memory 150, and sensors 160. Upon receiving source content 202 and source profile 204, system 200 may perform color adaptation process 206 on the received data, e.g., for performing gamut mapping, i.e., color matching across various color spaces, based on display profile 208. For instance, gamut matching tries to preserve (as closely as possible) the relative relationships between colors, even if all the colors must be systematically distorted in order to get them to display on the destination device.

Once the color profiles of the source and destination have been appropriately adapted, image values may enter framebuffer 210. A framebuffer may be defined as an image or video output device that drives image or video display from a memory buffer containing a complete frame of, e.g., image data. System 200 may perform various color management processes on color matched content in framebuffer 210 to display, on display 250, content that is in conformity with the source content author's rendering intent. For example, system 200 may encode (or the source content author may have already encoded) image values, e.g., pixel luma values, associated with the color matched content to account for gamma correction (or gamma adjustment) based on display 250's native display response which characterizes the luminance response of display 250 to input. For example, a LUT (e.g., LUTs 223) may be used to account for imperfections in display 250's luminance response curve, also known as the display transfer function, so that content displayed on display 250 corresponds to the source author's intended look for the displayed content. In other embodiments, a LUT may have separate channels for each primary color in a color space, e.g., a LUT may have Red, Green, and Blue channels in the sRGB color space. The LUT may be stored on a video card, in other memory, or in hardware within display 250 itself. The LUT may comprise a two-column table of positive, real values spanning a particular range, e.g., from zero to one. The first column values may correspond to an input image value, whereas the second column value in the corresponding row of the LUT may correspond to an output image value that the input image value will be "transformed" into before ultimately being displayed on display 250.

Perceptual model 212 may be used to implement a perceptually-aware and/or content-aware system to dynamically adjust display 250 by modeling the user's perception of the content data displayed to keep the user's experience of the displayed content relatively independent of the ambient conditions in which display 250 is being viewed and/or the content that is being displayed.

Perceptual model 212 may collect information about the ambient lighting conditions in the environment of viewer 260 of display 250. Perceptual model 212 may evaluate at least received environmental information, the viewer 260's predicted adaptation levels, and information about display 250, as well as the color matched source content itself that is being, has been, or will be displayed to viewer 260. Based on the evaluation, perceptual model 212 may output data that may be used to adapt (e.g., set, modify, and the like) transfer function 222, such that the viewer 260's perception of the content displayed on display 250 is relatively independent of the ambient conditions in which the display is being viewed.

The output of perceptual model 212 may suggest modifications to transfer function 222 associated with display 250 as a function of one or more display characteristics, e.g., gamma, black point, white point, or a combination thereof, of display 250. Perceptual model 212 may thus solve, or at least aid in solving, various problems with current display technology, wherein, e.g., content that it is intended to be viewed in a dark environment allocates far too few codes to the very bright display levels. When the same content is viewed in a bright environment, therefore, far too many codes may be utilized in the dark display levels, which may, in the bright viewing environment, be indistinguishable either from each other (or from true black).

Color matched source content in framebuffer 210 may be warped into display 250's visual display space (e.g., nominal range space, extended range space, and the like) based, e.g., on the predicted adapted human vision levels received from perceptual model 212 and the resulting modified transfer function 222. Transfer function 222 may thus cause display 250 to skip display codes that perceptual model 212 predicts viewers will be unable to distinguish between at their current adaptation levels. As illustrated within dashed line box 211, perceptual model 212 may take various factors and sources of information into consideration. For example, perceptual model 212 may take into consideration information indicative of ambient light conditions obtained from one more optical sensors 216 (e.g., ambient light sensors, image sensors, and the like). Perceptual model 212 may also take into consideration information indicative of the display profile 208's characteristics (e.g., an ICC profile, an amount of static light leakage for the display, an amount of screen reflectiveness, a recording of the display's 'first code different than black,' a characterization of the amount of pixel crosstalk across the various color channels of the display, display 250's color space, native display response characteristics or abnormalities, the type of screen surface used by the display, etc.).

Further, perceptual model 212 may take into consideration the display's brightness 214 (e.g., native device gamut of display 250); the displayed content's brightness 218; and/or a user's setting operation 220 (e.g., user input) regarding desired display brightness levels, user's adaptation levels, and the like. In some embodiments, perceptual model 212 may also take into consideration predictions from a color appearance model, e.g., the CIECAM02 color appearance model or the CIECAM97s model. Color appearance models may be used to perform chromatic adaptation transforms and/or for calculating mathematical correlates for the six technically defined dimensions of color appearance: brightness (luminance), lightness, colorfulness, chroma, saturation, and hue. In other embodiments, perceptual model 212 may also take into consideration information based on historically displayed content/predictions based on upcoming content. For example, the model may take into account both the instantaneous brightness levels of content and the cumulative brightness of content a viewer has viewed over a period of time.

Perceptual model 212 may then evaluate such information to predict the effect on the viewer's perception due to ambient conditions and adaptation and/or suggest modifications to improve transfer function 222 (e.g., the display device's tone response curves, LUTs, white point value, black point value, gamma value, and the like) for the viewer's current adaptation level. Thus, using perceptual model 212, system 200 may determine where the user's vision is adapted. If adapted to display 250, content may be digitally scaled and dithered so that nominal SDR content is mapped to a fraction of the brightness (corresponding to a low luminance value for white the user is adapted to) of display 250, thus adapting the user's vision so that the actual full brightness of the display is much higher. As is to be understood, the exact manner in which perceptual model 212 processes information received from the various sources, and how it modifies the resultant transfer function, e.g., by modifying LUT values, including how quickly such modifications take place, are up to the particular implementation and desired effects of a given system.

As alluded to above, the result of perceptual model 212's evaluation may be used to determine (e.g., set, update, modify, or change) transfer function 222 associated with display 250. Transfer function 222 may be applied (e.g., via 1D, 2D, or 3D LUTs) to pixel values of image content in a rendering or display pipeline to map (or warp) the content to a display space (e.g., extended range space, nominal range space) by manipulating pixel data. For example, in one embodiment, system 200 may modify one or more LUTs 223 to implement transfer function 222. LUTs 223 may be stored on a video card, in other memory, or in hardware within display 250 itself. After modification, LUTs 223 may serve to make transfer function 222 adaptive and "perceptually-aware" of the viewer's adaptation to the ambient conditions and the content that is being, has been, or will be viewed. That is, signal data (e.g., color matched source content) may be edited in an image processing pipeline (e.g., by changing the pixel values being rendered so as to adapt the values to whatever environment the user is in when viewing the content) based on output of perceptual model 212 (e.g., one or more LUTs 223 implementing transfer function 222). Further, since transfer function 222 may cause manipulation of image data in rendering pipeline 230 or display pipeline 240, the actual pixel values of the source content image may not be modified or altered.

LUTs 223 may serve as a useful and efficient place for system 200 to impose these perceptually-based display transfer function adaptations. It may be beneficial to use LUTs 223 to implement these perceptually-based display transfer function adaptations because the LUTs: 1) are easily modifiable, and thus convenient; 2) are configured to change properties for the entire display device; 3) can work with high precision content data without adding any additional hardware or runtime overhead to the system; and 4) are already used to carry out similar style transformations for other purposes (e.g., gamut adaptation), as described above. In some embodiments, modifications to LUTs 223 may be implemented gradually (e.g., over a determined amount of time). According to some such embodiments, LUTs 223 may be adjusted based on the rate at which it is predicted the viewer's vision will adapt to the changes. Further, when it is determined that changes to the LUTs 223 should be made, according to some embodiments, perceptual model 212 may determine the duration over which such changes should be made and/or the 'step size' for the various changes. For example, modification to LUTs 223 in response to perceptual model 212 modifying transfer function 222 to switch from "normal" mode to EDR mode may be performed gradually, over time, depending on set user preferences.

In another embodiment, modified transfer function 222 may directly control display 250 by being implemented as display 250's electro-optical curve to adjust output intensities for one or more color channels. That is, output of perceptual model 212 may be implemented by adapting the changes or "steps" in output intensity directly in display 250's transfer function (e.g., tone response curve) itself. Thus, lowering or enhancing "pixel values", as used in this disclosure, may refer to adjusting either pixel values in the image processing pipeline or directly adjusting output intensities of display 250.

The transfer function 222 may comprise a modification to the display's white point, black point, and/or gamma, or a combination thereof. For reference, "black point" may be defined as the level of light intensity below which no further detail may be perceived by a viewer. "White point" may be defined as the set of values that serve to define the color "white" in the color space. For example, when perceptual model 212 determines based on ambient light levels and viewing conditions that a user is adapted to a low light (e.g., dim or night-time) viewing environment, perceptual model 212 may modify transfer function 222 to set the white point (e.g., a white luminance value of the display panel) of display 250 to be lower than the target or native white point (e.g., the maximum luminance value of the display panel) of display 250.

The modifications to the transfer function may be implemented via the usage of a parametric equation, wherein the parameters affecting the modified transfer function 222 include the aforementioned display white point, black point, and gamma. Using a parameterized equation may allow the changes to the transfer function to be specified in a 'lightweight' fashion (e.g., only needing to transmit that changed values of the parameters from perceptual model 212 to display 250) and easily allowing transfer function 222 to change gradually over time, if so desired.

In one embodiment, perceptual model 212 may determine black level for a given ambient environment, e.g., by using an ambient light sensor 216 or by taking measurements of the actual panel and/or a diffuser of display 250. Diffuse reflection of ambient light off the surface of device 250 may mask a certain range of darkest display levels displayable on display 250. In other environments, light levels below a certain brightness threshold will simply not be visible to the viewer. Once this level is determined, the black point may be adjusted accordingly. For example, system 200 may not assign any display codes to perceptual bins at or lower than the determined black point, instead determining to assign its limited number of display codes (e.g., the 2^8 or 2^9 codes of display 250) only to areas where viewer 260 would actually be able to perceive changes in brightness (while also intelligently assigning codes more densely in ranges of brightness where the viewer is predicted to have greater levels of acuity).

In another embodiment, perceptual model 212 may determine the appropriate white point for a given ambient environment similarly, e.g., by using one or more optical sensors 216 to analyze the lighting and color conditions of the ambient environment. The white point for display 250 may then be adapted to be the determined white point based on viewer 260's surroundings. In one particular embodiment, this modification, or "white point adaptation," may be performed by not assigning any display codes to perceptual bins at brightness levels higher than the determined white point, as such codes would be 'wasted' on the viewer, given their predicted adaption level. However, as explained in more detail below, in the EDR mode, system 200 may assign display codes at brightness levels higher than the determined white point for a color boosting operation in which content may be rendered with perceptually higher dynamic range and wider gamut in luminance (e.g., "brighter than white" content like specular reflections, high luminance sunlight spots, explosions, and the like) and also in color (e.g., boosted or more vivid colors for selected range or region). Additionally, it is noted that modifications to the white point may be asymmetric between the LUT's Red, Green, and Blue channels, thereby moving the relative RGB mixture, and hence the white point.

In another embodiment, a color appearance model (CAM), such as the CIECAM02 color appearance model, may further inform perceptual model 212 regarding the appropriate amount of gamma boost to apply with transfer function 222. The CAM may, e.g., be based on the brightness and white point of the viewer's surroundings, as well as the field of view of the display subtended by the viewer's field of vision. In some embodiments, knowledge of the size of the display and the distance between the display and the viewer may also serve as useful inputs to the model. Information about the distance between the display and the user could be retrieved from a front-facing image sensor, such as a front-facing camera (e.g., image sensor 110). For example, for pitch black ambient environments, an additional gamma boost of about 1.5 imposed by the LUT may be appropriate, whereas a 1.0 gamma boost (i.e., unity, or no boost) may be appropriate for a bright or sun-lit environment. For intermediate surrounds, appropriate gamma boost values to be imposed by the LUT may be interpolated between the values of 1.0 and about 1.5. A more detailed model of surround conditions is provided by the CIECAM02 specification.

As explained above, transfer function 222 (e.g., black point, white point, gamma, assignment of codes of display 250 to source content, and the like) may be modified based on ambient user adaptation as evaluated and output by perceptual model 212. In one embodiment, when ambient brightness associated with display 250 as detected by optical sensors 216 is determined to be below a predetermined threshold, perceptual model 212 may evaluate a current ambient user adaptation level to be that for a low luminance environment. When perceptual model 212 detects the low luminance adaptation level (e.g., environment in which user can be adapted to less than 100% luminance of display as "white"), perceptual model 212 may output modifications to transfer function 222 for operating display 250 in an EDR mode (e.g., display mode). Perceptual model 212 may also output modifications to transfer function 222 for operating in the EDR mode when one or more other conditions are satisfied. Conditions detectable by perceptual model 212 that may cause perceptual model 212 to modify transfer function 222 for operating in the EDR mode may include detection of low ambient light levels, night-time environment, indoor environment, low-brightness source content 202, predetermined user operation (e.g., user input to lower display brightness), wide gamut display 250 with a gamut wider than that required by source content 202, or any other condition in which it is desirable to set display 250's white luminance value (e.g., white point) to be lower than the native or target white point of display 250.

When set in EDR mode (e.g., display mode), transfer function 222 may be adapted to lower pixel values (e.g., luminance value for "white") during rendering so that the lowered values are mapped to a nominal range space defined by the adjusted white luminance value. Alternately, transfer function 222 for EDR mode may directly control display 250 without modifying the pixel values, so that lowered output intensities (e.g., for white) achieved by display 250's transfer function are mapped to the pixel values based on the nominal range space of the adjusted low luminance white. That is, in EDR mode, instead of, e.g., adjusting a backlight of display 250 to lower luminance of display 250, pixel values or output intensity of pixels of display 250 (e.g., RGB values) may be lowered in the pixel pipeline to the user adapted white. Conversely, when not in EDR mode, perceptual model 212 may adjust brightness of display 250 by lowering the backlight to save power. Further, since the adjusted low luminance white (e.g., white point) is based on ambient user adaptation identified by perceptual model 212, the lower pixel value for white or the lower output intensity for white (i.e., a relatively "gray" version of "white") rendered or displayed on display 250 based on the modified transfer function 222 is comfortably accepted and perceived as "white" by the user adapted to the viewing conditions.

Figure 3:
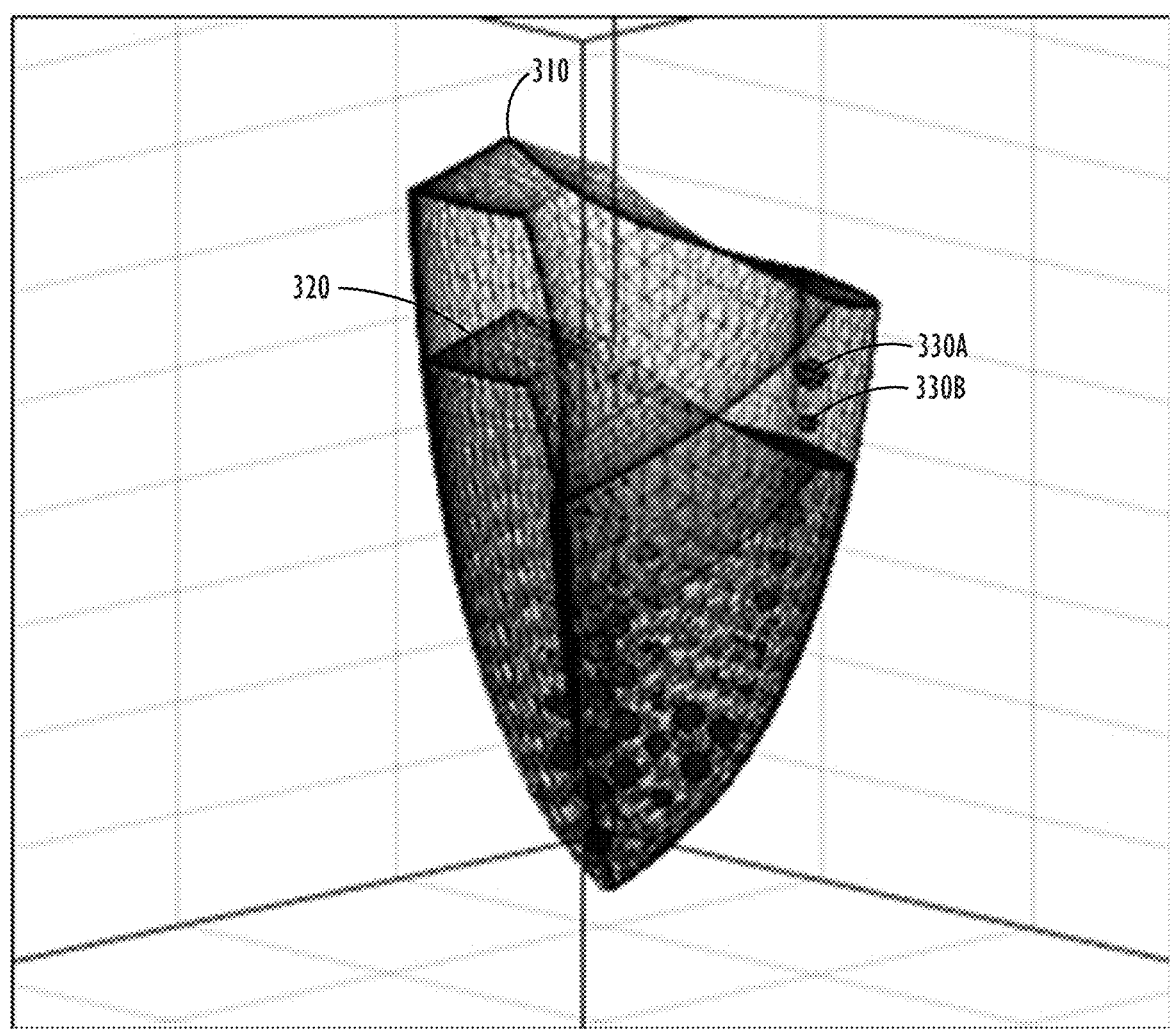
FIG. 3 illustrates a combined representation of a color gamut of low luminance white to which a user is adapted, and the native device gamut, in accordance with one or more embodiments.

The nominal range space may be a display or rendering space that corresponds to the user adapted white that is lower than the maximum luminance white of display 250. A relationship between the nominal range space and a "full" range space of display 250 is explained below with reference to FIG. 3. FIG. 3 illustrates combined representation 300 of a color gamut of the low luminance white to which a user is adapted, and the native device gamut, in accordance with one or more embodiments. In FIG. 3, color volume 320 may correspond to the nominal range space that is based on the user adapted white (or user adapted black) in the EDR mode. Transfer function 222 may thus be adapted to reproduce the gamut of colors defined by (the smaller) color volume 320, when output from perceptual model 212 dictates setting of, e.g., the lower luminance white point corresponding to color volume 320. When the user is adapted to the low luminance white corresponding to color volume 320, the user is perceptually expecting the gamut of colors produced by color volume 320. Further, in FIG. 3, color volume 310 may correspond to the full range space that display 250 may be capable of producing when display 250 is set at the native or target white point (e.g., native or calibrated luminance level of 100% luminance or brightness) at which pixels (and backlight, if any) of display 250 are energized at full power. Color volume 320 may change depending on modifications to transfer function 222 (e.g., changes based on ambient brightness levels). However, color volume 310 corresponds to the native device gamut representing the gamut of colors display 250 is natively capable of producing under ideal conditions. Thus, in EDR mode, instead of using the full dynamic range of display 250, by adjusting display to the low luminance white (so the user is not "blinded" in, e.g., a low luminance environment), a reduced dynamic range and gamut corresponding to the nominal range space (color volume 320) is utilized.

As explained above, by adjusting the white point to the user adapted white (or adjusting black point to user adapted black, or both), transfer function 222 for EDR mode may utilize the EDR color gamut defined by color volume 320. An extra luminance range (e.g., extended range space) defined by the difference between full or native color volume 310 and the current color volume 320 may remain unutilized (while white pixel values being comfortably accepted as "white" by the user adapted to current viewing conditions). In one embodiment, transfer function 222 for EDR mode may be set so as to take advantage of the extra luminance range from the luminance of the user adapted white (e.g., based on the adjusted white point) to the maximum luminance white of display 250. For example, transfer function 222 for EDR mode may be set so that predetermined content is mapped to codes that are displayable on display 250 and that fall in the extra luminance range. The predetermined content that may be set to take advantage of the extended range space that is available in the EDR mode with the lower luminance white may include higher dynamic range and wider gamut content in luminance and color. For example, the content may include "brighter than white" content like specular reflections, high luminance sunlight spots, explosions, and the like.

Further, the content may also include color content whose color is boosted or made more vivid (e.g., brighter or more saturated color content of the same hue). For example, red content (e.g., red pixels) in an SDR image displayed on display 250 in EDR mode may be highlighted by adjusting transfer function 222 for red to induce the experience of a more vivid red color and (in some cases) induce the sensation of a wider color range (gamut) than the range of colors normally expected for conditions to which the viewer is adapted. That is, in the example shown in FIG. 3, even when transfer function 222 may be set based on the user adapted white luminance value to be able to produce the EDR gamut of colors defined by color volume 320, in some embodiment, transfer function 222 for red may be further modified so that display 250 may produce a more bright and/or more vivid red 330A,B (e.g., more saturated red of the same hue) that may fall in the extra luminance range defined by full color volume 310 (i.e., outside color volume 320 corresponding to the low luminance white currently set on display 250). Transfer function 222 for red may thus produce the effect of boosting the red color in this example so as to increase the dynamic range of the image, even if no white level in the image may suggest this effect. By exploiting the extra luminance range in the color boosting operation, a perceptually wider color gamut for the user adapted to the current low luminance white point can be obtained even though the native color gamut corresponding to color volume 310 does not change.

Returning to FIG. 2, to implement the above described color boosting operation, system 200 may include EDR rendering pipeline 230. Transfer function 222 may further be modified (e.g., LUTs 223 updated) based on input from EDR rendering pipeline 230. EDR rendering pipeline 230 may include transformation calculation module 236 and animation engine 238. Based on one or more input parameters (e.g., region or range selection 232, parameter selection 234, and the like), EDR rendering pipeline 230 may perform modifications to transfer function 222 to boost or enhance one or more colors (e.g., a range of hues) in an image (e.g., color matched source content 202). The modifications to transfer function 222 in EDR mode may thus take advantage of the extended range space defined between the lower luminance white and the maximum luminance white to display colors more vividly.

Region or range selection 232 may include selection of one or more ranges of hues based on user input (e.g., using a color wheel) that are to be boosted in the EDR mode. For example, the user may select an area or region of an image to identify hues that are to be enhanced. That is, input parameter 232 may include selection of chromatic information (not luminance information on a gray axis) that is to be enhanced. In one embodiment, multiple ranges of hues may be suggested as color candidates to the user based on predetermined processing performed on the image content. For example, a saliency network associated with system 200 may identify one or more "important" regions of the image (e.g., regions meeting predetermined conditions like "washed-out" regions), and EDR rendering pipeline 230 may automatically recommend the identified regions (and corresponding hue ranges) as candidate regions whose colors can be boosted or enhanced. In one embodiment, the saliency network may identify as candidate colors, memory colors like colors for clouds, grass, sky, skin tones, pavement, sport colors, and the like. Region or range selection 232 may also include input of one or more geometrical or spatial regions (e.g., selection of an object of interest (e.g., face, clouds, trees, and car) in the image based on object recognition) in the image by the user. One or more ranges of hues corresponding to the user selected spatial regions may then be identified as candidates for the color boosting operation.

Parameter selection 234 may include setting an intensity of the boosting operation to be applied to the range or region of hues selected at 232. Parameter selection 234 may be implemented as a slider for allowing the user to fine tune to a desired level or degree of the enhancement or boosting effect to be applied for the selected hues (i.e., variable degree of color vividness), such that the naturalness of the image is preserved. Parameter selection 234 may thus allow the user to select the amplitude of the color boosting effect to be applied to the image. In one embodiment, parameter selection 234 may be manually input by the user. Alternately, the intensity of the effect may be automatically selected by system 200 based on data from perceptual model 212. For example, in a relatively dim ambient environment, amplitude of the intensity of the color boosting effect may be reduced to preserve naturalness of the image and not introduce unnatural artifacts. However, in a relatively bright ambient environment, amplitude of the intensity of the color boosting effect may be increased in order to make the color boosting effect more discernable.

In some embodiment, if the color boosting operation is to be applied to a large area in the image, parameter 234 may be set so as to reduce the intensity of the enhancement, to preserve the naturalness of the image. On the other hand, "spot colors" occupying only a small area (e.g., sunset) in the image may be boosted more for powerful effect. The intensity of the color boosting effect may be a matter of taste, and the user may wish to set the level of intensity desired based on intended goals of the image. For example, in marketing or video production, the user may wish to boost selected regions or colors more to attract attention of the viewer. However, in other applications, the user may wish to boost selected regions or colors less to preserve the naturalness of the image. Also, the range of boosting available for any given color may depend on a size of the extended range space (e.g., portion of color volume 310 outside color volume 320) available. For example, when perceptual model 212 adjusts the white luminance value (e.g., white point) to be closer to the native or target white point based on ambient conditions, the extended range space available may become smaller, and hence, the amount (or range) of boosting available for the color boosting operation may diminish proportionally. Thus, when display 250 is set at the maximum luminance, no extended range space may be available and so, no color boosting operation may be performable in the EDR mode.

Based on the input parameters 232 and 234, transformation calculation module 236 of EDR rendering pipeline 230 may apply a transformation to adjust or modify transfer function 222 in order to account for the color (and luminance) boosting operation to the image content. The transformation to adjust or modify transfer function 222 may be applied as an analytical function defining vector equations (e.g., matrix equations) applied to perform the color boosting operation based on the input parameters for separating the region of space (e.g., hue range) where the color boosting operation is to be applied, and for setting the intensity of the enhancement. The analytical function may be implemented as a simple linear equation. Alternately, the analytical function could be a curve, a non-linear function, a smoothing function, and the like. In another embodiment, the transformation to adjust or modify transfer function 222 may be applied via one or more LUTs (e.g., 3D LUTS).

In one embodiment, transfer function 222 may include a curve for each of red, green, and blue color channels. Each transfer function curve may be governed by a perceptual quantizer (PQ) curve that is used for displaying HDR content. As explained above, in the EDR mode, transfer function 222 may be modified so as to map to the user adapted low luminance white. This may be achieved by, e.g., "going along" the PQ curve so as to be governed by what is optimal for the EDR mode for each color channel. The transfer function curve for each color channel for EDR mode may be set so that even when pixel values (or output intensity) are lowered to adapt to the low luminance white, the hue and naturalness of the image is preserved and color balance between red, green, and blue color channels is maintained.

When transfer function 222 is to be further modified based on input parameters 232 and 234 to perform the color boosting operation, transform calculation module 236 may select an appropriate region of space (e.g., hue range) based on input parameter 232, and "go along" each transfer function curve to boost the corresponding colors in the selected region of space based on the intensity of color boosting effect specified by input parameter 234. This operation ensures the corresponding hue for the boosted color is preserved along with the naturalness of the image, and the color balance between the red, green, and blue color channels for the boosted colors is also maintained.

In effect, in the EDR mode, transfer function 222 lowers pixel values or output intensities for color and luminance of the image based on the reduced luminance value of white determined by perceptual model 212. Based on input parameters 232 and 234, transform calculation module 236 diminishes this (lowering) effect of the EDR mode for selected hues in the image so as to attenuate less, the pixel values or output intensities for the certain hues in the image, thereby producing the "visual effect" of boosting colors (and luminance) corresponding to the selected hues. In fact, the selected hues may appear "boosted" because their respective pixel values may be "reduced less" in the EDR mode, based on input parameters 232 and 234. The "boosted" color may preserve exactly the balance between R, G and B components, because the "boosted" color is simply the color that is "attenuated less" in the EDR mode. For example, the intensity of the "boosted" color may be lower than what it was originally but higher than what it was in the EDR mode, thereby the color appearing "boosted".

In the color boosting operation in EDR mode, transform calculation module 236 may transform both luminance and color in the image via modifications to transfer function 222. For example, transform calculation module 236 may modify transfer function 222 to display "brighter than white" content like specular reflections by going along a vertical vector for luminance (e.g., luminance (Y) axis) that goes from black to white. Further, to boost color based on input parameters 232 and 234 in EDR mode, transform calculation module 236 may modify transfer function 222 to display color boosted image content by going along a side vector for the selected color that extends to the direction of the hue that is governing that color, thereby enhancing only a particular color component (as opposed to white luminance which may include all color components). Since the luminance vector and the color vector are different vectors in space, both transformations may be performed by transform calculation module 236 simultaneously and independently of each other.

An exemplary algorithm that may be used to implement functionality of transform calculation module 236 is illustrated below. In the algorithm below, $IMAGE_{in}$ may represent a source image that is to be attenuated by 50% (parameter A3) to produce output EDR image generated after processing, i.e., $IMAGE_{out}$. Red, green, blue channels may be processed independently in this example by using parameters A1 and A2 for the red channel, and parameters A4 and A5 for the green channel. Blue channel may be left unchanged in this example. H and W may represent dimensions of an image array of $IMAGE_{in}$ and $IMAGE_{out}$. R, G, and B may represent the red, green, and blue components (channels) of the image respectively, and i and j may represent row and column in $IMAGE_{in}$ or $IMAGE_{out}$. Text following the symbol "//" are explanatory comments.

```
for i=1:H
  for j=1:W
    R=IMAGE_in ((i,j),1);
    G=IMAGE_in ((i,j),2);
    B=IMAGE_in ((i,j),3);
    A1=0.6; // parameter selection
    A2=2.5; // parameter selection
    A3=0.5; // parameter selection
    if ((R>A1) && (G<A1) && (B<A1) // definition of
        space region for R channel
      IMAGE_out ((i,j),1)=A3*(A1+A2*(R-A1));  //
          example of processing function for R channel
    else
      IMAGE_out ((i,j),1)=A3*R; // example of processing
          function for R channel
    end
    A4=0.2; // parameter selection
    A5=1.0; // parameter selection
    if ((G>A4) && (R<A4) && (B<A4)) // definition of
        space region for G channel
      IMAGE_out ((i,j),2)=A3*(A4+A5*(G-A4));  //
          example of processing function for G channel
    else
      IMAGE_out((i,j),2)=A3*G; // example of processing
          function for G channel
    end
    IMAGE_out ((i,j),3)=A3*B; // example of processing
        function for B channel, which is left unchanged
  end
end
```

The above example represents a simple transformation that changes the input image $IMAGE_{in}$ by 50% attenuation and selects a region of space for which a curve used for processing is simply a ramp that starts at A1 and A4 with rising factor A2 and A5, respectively, for red and green channels, and blue channel left unchanged. Of course, other, more complicated functions can be devised.

By applying the features of system 200, when rendering and displaying any image (e.g., even an image with SDR content) in the EDR mode, the image can be enhanced as if it were an HDR image by just boosting certain (e.g., hue, geometrical, or spatial) regions of the image to have a higher dynamic range and wider gamut not only in luminance but also in color. Thus, despite display 250 having the same native display gamut corresponding to color volume 310, by mapping image content to the reduced color gamut defined by color volume 320 in the EDR mode with the user adapted low luminance white and creating the extended range space that is outside the color volume 320, system 200 can take advantage of the extended range space by increasing the dynamic range and gamut of certain selected hues or regions of the image, thereby creating the appearance of boosted colors that are of a wider gamut than the narrow gamut of the image rendered and displayed in EDR mode.

Conventional techniques for color boosting may involve simply boosting a saturation component of a selected color. However, typically, when the saturation component is boosted, the corresponding hue component also gets altered (e.g., pure red hue, when "boosted" by increasing saturation, may become somewhat orange-ish or magenta-ish), thereby destroying the overall naturalness of the image and color balance of RGB channels. On the other hand, with system 200 for improved color rendering in EDR mode, by creating the extended dynamic range space and mapping image content to the low luminance white of the nominal range space, certain selected colors may be boosted (e.g., by increasing the corresponding saturation value and/or corresponding brightness or luminance value) without changing their corresponding hue component, and preserving the naturalness of the image and color balance between RGB color channels. Simply by modifying image content (e.g., SDR content) as it passes through rendering pipeline 230 and display pipeline 240 so that a certain selected region of the image content is enhanced (e.g., less attenuated than all the other pixels in the EDR mode) so as to appear as boosted on the screen, transfer function 222 may achieve desired effect on the image data, without changing actual pixel values of the (source content) image at the source level.

EDR rendering pipeline 230 may further include animation engine 238 to adjust the transformation applied to transfer function 222 (e.g., via LUTs 223) by transform calculation module 236, based on the rate at which it is predicted the viewer's vision will adapt to the changes. For example, in some embodiments, animation engine 238 may attempt to match its changes to transfer function 222 (or LUTs 223) to the predicted rate of change in the viewer's perception. Further, when it is determined that changes to transfer function 222 or LUTs 223 should be made based on transformation applied by transform calculation module 236, according to some embodiments, animation engine 238 may determine the duration (predetermined period of time) over which such changes should be made and/or the 'step size' for the various changes. Thus, in the EDR mode, animation engine 238 may gradually "fade in" the new boosted colors for, e.g., regions in the image having the selected range of hues, based on input parameters 232 and 234.

Modified transfer function 222, as modified by transform calculation module 236, may be applied to rendered and encoded source content to generate encoded content. Display pipeline 240 may receive the encoded content via transfer function 222 and EDR rendering pipeline 230, and may decode and process the received content to generate display content formatted for display on display 250.

The features of system 200 may be implemented using hardware resources including one or more processors and one or more graphics processing units (GPUs) to render and display source content. The processors may be implemented using one or more central processing units (CPUs), where each CPU may contain one or more processing cores and/or memory components that function as buffers and/or data storage (e.g., cache memory). The processors may also be part of or are coupled to one or more other processing components, such as application specific integrated circuits (ASICs), field-programmable gate arrays (FPGAs), and/or digital signal processors (DSPs). The hardware resources may be able to utilize the processors, the GPUs, or simultaneously use both the GPUs and the processors to render and display source content. Hardware resources may also include other types of hardware resources (e.g., memory) known by persons of ordinary skill in the art for rendering and displaying source content. For example, hardware resources may include a windows server, where content of a particular window (e.g., an active window) out of multiple windows displayed on a display is modified to be in EDR mode based on features of system 200, while avoiding boosting any colors that may be limited by certain constraints (e.g., system defined user interface (UI) colors, spot colors). In one embodiment, certain predetermined areas of a UI (e.g., buttons, text fields, and the like) may be enhanced using features of system 200 to guide a user toward a next operation to be performed or next option to be selected in the UI (e.g., enhance color of next button to be pressed via color boosting operation in EDR mode). The UI buttons may also be enhanced differently (e.g., by adjusting the intensity of the color boosting operation) to show different degrees of likelihood or probability. In another embodiment, features of system 200 may be applied for photo rendering applications where artistic effects to content of the photo rendering application window may be desirable.

Figure 4:
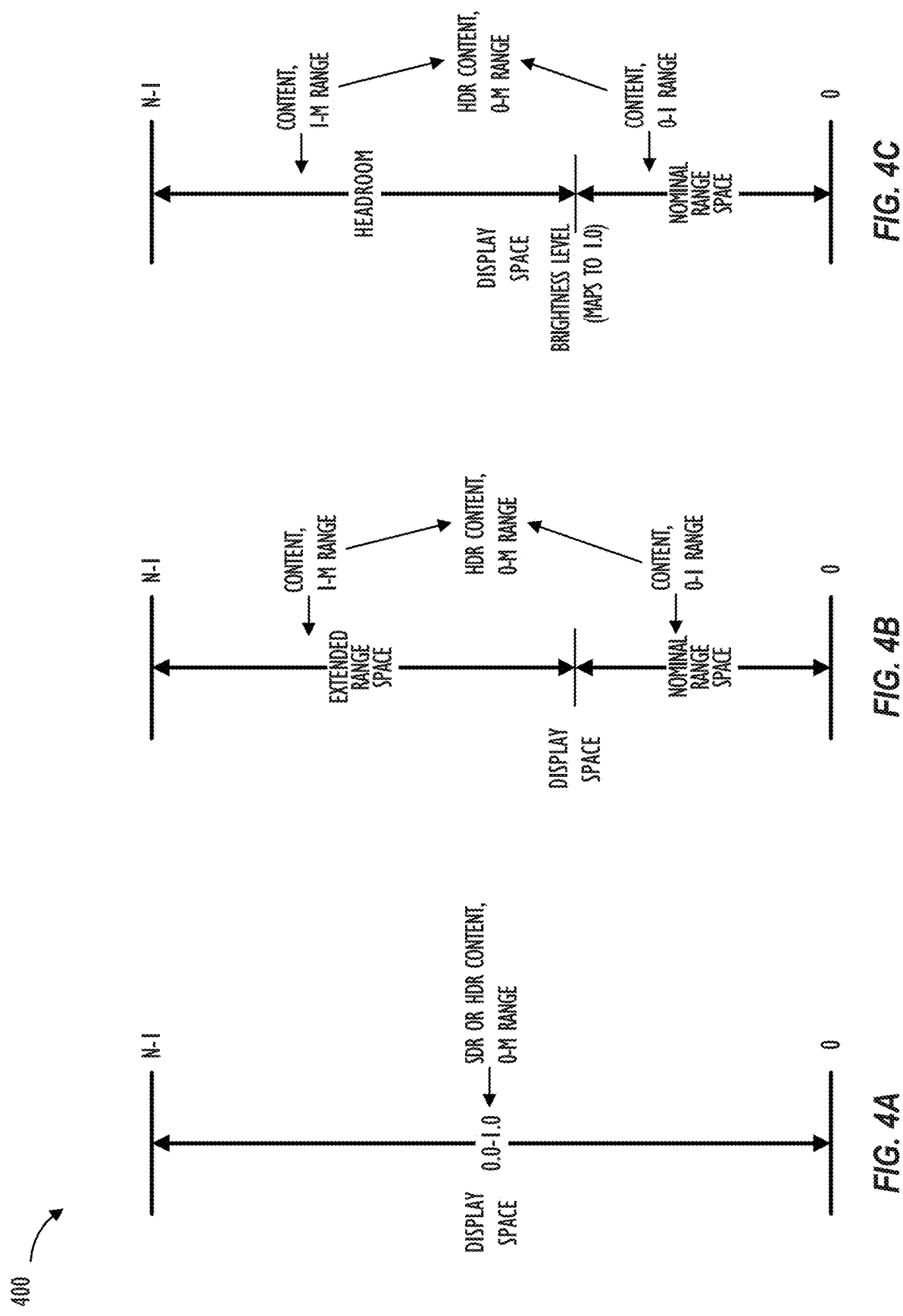
FIGS. 4A, 4B, and 4C illustrate an exemplary method for mapping image content to a display device, in accordance with one or more embodiments.

Mapping performed by modified transfer function 222 to map pixel values (or output intensities) to the nominal range space defined by the adjusted white luminance value (e.g., white point lower than maximum, native, or target white point) and to the extended range space of display 250 is explained in further detail below with reference to FIGS. 4A-4C. In the embodiment illustrated in FIGS. 4A-4C, content being mapped to the nominal range space and the extended range space may be content that has already been rendered (e.g., by EDR rendering pipeline 230). The rendered content may be mapped to the nominal range space and the extended range space of a display space representing output intensities of display 250, based on modified transfer function 222 (e.g., LUTs 223) as modified by perceptual model 212. However, in another embodiment, the content may simply be source content being mapped into a rendering space. Concepts explained below in connection with the embodiment illustrated in FIGS. 4A-4C may also be applicable to an embodiment where modified transfer function 222 may map pixel values to the nominal range space and the extended range space of the rendering space.

FIGS. 4A-4C illustrate an exemplary method for mapping rendered image content to the display space (e.g., nominal range space, display range space, and the like) of display 250, in accordance with one or more embodiments. The mapped content (e.g., color matched and rendered source content) may be content having a standard dynamic range. Alternately, the content may have a dynamic range that is higher than SDR (e.g., HDR content). As shown in FIGS. 4A-4C, the content may be rendered into a range 0.0-M based on modified transfer function 222 output from perceptual model 212 (and further modified by transform calculation module 236). M may represent a maximum rendering value and may be determined based on modified transfer function 222. In FIGS. 4A-4C, N represents the number of codes (intensity levels) supported by the display (e.g., an 8-bit display supports 256 codes or intensity levels for each sub-pixel).

FIG. 4A illustrates mapping rendered image content (e.g., SDR or HDR content) to a normal or standard display (e.g., an 8-bit display) in a normal lighting environment (e.g., white point set at native or target white point with 100% luminance or brightness based on output of perceptual model 212). FIG. 4B illustrates mapping the content to a bright or HDR-enabled display (e.g., a 10-, 12- or higher bit display). FIG. 4C illustrates mapping the image content to a normal or standard display (e.g., an 8-bit display) in a dim lighting environment (e.g., EDR mode where white point set to a lower luminance white that is less than the native or target white point based on output of perceptual model 212). The portion of the display space into which the standard range (0.0-1.0) or SDR content is mapped may be referred to as the nominal range space.

FIG. 4A illustrates mapping the image content to a normal or standard display (e.g., an 8-bit display) in a normal lighting environment, according to some embodiments. For an 8-bit display, number N of codes supported by the display is 256. In the normal lighting environment, the nominal range space (0.0-1.0) may extend across all of the display's codes. In this example, for an 8-bit display, the codes are 0-255, and typically 0.0 maps to code 0, and 1.0 maps to code 255. The input content, rendered into the range 0.0-M, may be mapped by display pipeline 240 (via transfer function 222) into the 256 codes of the display space. In some embodiments, the maximum value M may be mapped to 1.0/code 255, with 0.0 mapped to 0.0/code 0. Note that the mapping may be, but is not necessarily, linear. In some embodiments, a simple scale or multiplication function may be used to perform the mapping. In some embodiments, the mapping may be performed according to a gamma function, for example a gamma function determined according to perceptual model 212 as described herein. In some embodiments, one or more LUTs (e.g., LUTs 223) may be used to perform the mapping. In some embodiments the LUTs may be adapted to correct for particular displays or types of displays, or to otherwise warp or adjust the mapping.

FIG. 4B illustrates mapping the content to a bright or HDR-enabled display (e.g., a 10-, 12- or higher bit display), according to some embodiments. For a 10-bit display, N=1024. Thus, the codes are 0-1023. In some embodiments, standard range (0.0-1.0) or SDR content such as text or user interface (UI) elements may be blended or composited with rendered HDR content by display pipeline 240 prior to display. In some embodiments, when compositing or blending the SDR content with the HDR (0.0-M) content in the display space, the SDR content and standard (0.0-1.0) portion of the HDR content may be mapped or compressed into a lower portion (nominal range space) of the display space (e.g., codes 0-511 for 10-bit), with the extended range (1.0-M) portion of the HDR content mapped into the remainder (extended range space) of the display space (e.g., codes 512-1023 for 10-bit). Note that the mapping may be, but is not necessarily, linear. In some embodiments, in EDR mode, since display has a wider color gamut than the color gamut of the image content, transfer function 222 may map the image content to the nominal range space. Transfer function 222 may then utilize the extended range space (1.0-M) of the HDR display to display perceptually higher dynamic range and wider color gamut content in both luminance and color. System 200 may allow the user to perform the color boosting operation for selected regions or hues of the image, thereby increasing the dynamic range and gamut of the image content for selected color components (and/or for white).

FIG. 4C illustrates mapping the content to a normal or standard display (e.g., an 8-bit display with color gamut defined based on sRGB color space, DCI-P3 color space, Rec 2020 color space, and the like) in a dim lighting environment, according to some embodiments. In a dim environment, even a normal display will appear very bright, and may appear uncomfortably bright to adapted viewer vision. Thus, perceptual model 212 may modify transfer function 222 for EDR mode so that pixel values or output intensities may be lowered for the user adapted low luminance white, and so that resultant brightness of display content is dimmed to a level which is more comfortable to the user (while white pixel values being comfortably accepted as "white" by the user adapted to current viewing conditions). In some embodiments, a brightness control (e.g., brightness slider UI element) may allow the user to manually select a dimmer setting than that evaluated and output by perceptual model 212.

Embodiments of system 200 for color rendering in EDR mode may take advantage of the "headroom" or unused portion of the display space (extended range space) created by the dimmed brightness level of the user adapted low luminance white which is less than 100% of the maximum luminance white of display 250 to display SDR content with a higher (or extended) dynamic range on the standard display. That is, in EDR mode, dynamic range of the SDR content may be selectively extended (both in luminance and in color) by modifications to transfer function 222 (as modified by perceptual model 212 and further modified by transform calculation module 236) to take advantage of the "headroom" portion of the display codes to display, e.g., not only "brighter than white" content like specular reflections and sunlight spots, but also boosted color content like more saturated or brighter colors of the same hue and same color balance between RGB channels.

For example, in EDR mode, if display brightness is 50% (i.e., white luminance value is 50% of the maximum white luminance value (native or target white point) when pixels of display 250 energized at full power), for an 8-bit display, the upper or "headroom" portion (extended dynamic range) of the display codes (128-255) may be used for the extended or HDR portion of the content (luma values 1.0-M) (i.e., higher dynamic range content displayed in extended range space corresponding to difference between color volume 310 and color volume 320), with the lower portion (0-127) used for the standard or SDR portion of the content (luma values 0.0-1.0) (i.e., content corresponding to smaller color volume 320). Note that the mapping may be, but is not necessarily, linear.

Thus, in EDR mode, display panel backlight may be left at full power when mapping the color matched (rendered) source content to the nominal range space. The standard range (0.0-1.0) values are mapped or compressed into the lower portion of the display space (i.e., the nominal range space), with the extended range (1.0-M) space of the HDR content mapped into the upper or "headroom" portion of the display space (the headroom is the upper region of the display space to which the values above 1.0 are mapped). Leaving the backlight at full power when displaying the HDR content in a dim environment, the standard content is displayed at a comfortable level for the viewer, while very bright effects such as explosions may be displayed in a way that is perceptually impressive when the viewer's perception is dim adapted. The headroom may further also be used for color components that may be boosted or made more vivid so as to perceptually appear to be of a gamut outside the EDR gamut of the user adapted low luminance white.

Figure 5:
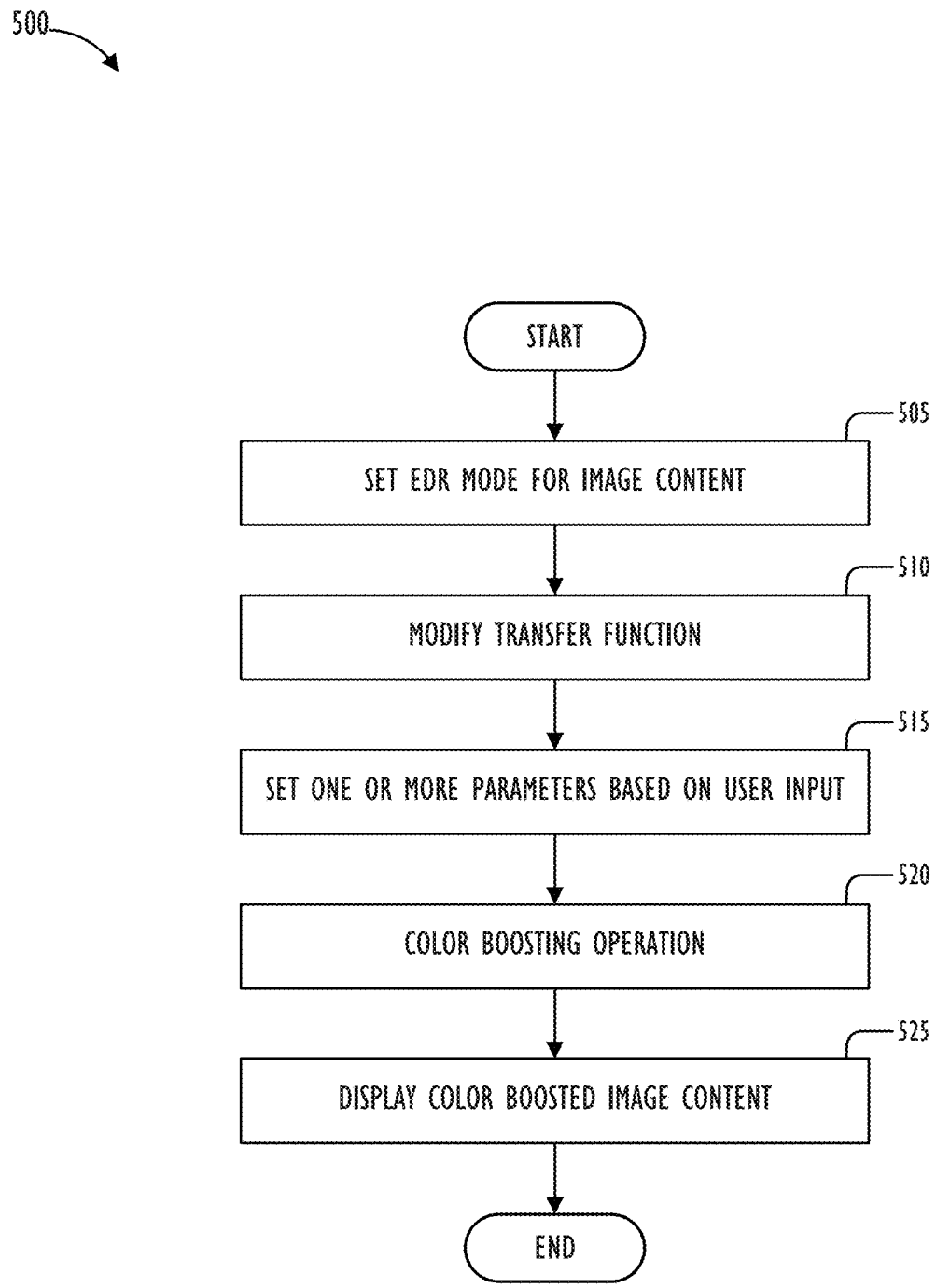
FIG. 5 illustrates, in flowchart form, a process for performing color rendering in EDR mode, in accordance with one or more embodiments.

FIG. 5 illustrates, in flowchart form, a process for performing color rendering in EDR mode, in accordance with one or more embodiments. Flowchart 500 begins at block 505 with perceptual model 212 detecting conditions associated with display 250 based on input from multiple sources (e.g., display brightness (native device gamut) 214, display profile 208, optical sensors 216, content brightness 218, user setting operation 220, and the like). Based on an evaluation of the detected conditions, perceptual model 212 may determine setting the EDR mode for predetermined image content (or for entire display 250). For example, when ambient light levels are low, perceptual model 212 may modify transfer function 222 to a low luminance white to avoid blinding the user and thus set the EDR mode in which an extended range space is available between the low luminance white and the maximum luminance white displayable by display 250. As another example, when perceptual model 212 detects display 250 as a wide gamut (e.g., wider gamut than that needed by the image content) display, perceptual model 212 may similarly modify transfer function 222 to create the extended range space for EDR mode. In one embodiment, perceptual model 212 may be implemented so as to manipulate content in an image processing (e.g., rendering or display) pipeline to set all content on display 250 to EDR mode. In another embodiment, perceptual model 212 may be implemented for a specific application so that image content only within a specific window (e.g., active window, photo rendering application window, UI components, and the like) displayed on display 250 is set to display in EDR mode.

At block 510, based on the evaluation, perceptual model 212 modifies transfer function 222 for image content in EDR mode. For example, transfer function 222 may be modified by adjusting one or more LUTs 223 to manipulate pixel values in a rendering pipeline without modifying actual pixel values of the source content. Alternately, transfer function 222 may be modified so as to directly adjust output intensities (e.g., EOTF, tone mapping curve) of display 250 based on evaluation by perceptual model 212. As a result of the modification to transfer function 222, pixel values (or output intensities) of image content may be mapped to a nominal range space (See FIGS. 4B-4C).

At block 515, a user may input one or more parameters (232, 234) to specify a range of hues or a spatial or geometric range in the image for which the color boosting operation is to be performed. For example, the user may input a hue range on a color wheel for which the color boosting operation is to be performed. Alternately, the user may select an area or region of the image to identify hues for which the color boosting operation is to be performed. As another example, system 200 may automatically identify regions (e.g., using a saliency network) in the image (e.g., over-saturated or "washed-out" regions) as candidates where the color boosting operation is to be performed. User may also identify (or system 200 may automatically identify using pattern recognition as candidates) spatial or geometric regions (e.g., face, clouds, trees, and the like) to which the color boosting operation may be applied. The user at block 515 may also input the intensity of the color boosting effect as desired. For example, in a low light ambient environment, the user may wish to boost the colors less, to preserve the naturalness of the image. However, in bright ambient environments, the user may wish to boost more, to make the effect more discernable.

At block 520, EDR rendering pipeline 230 may perform the color boosting operation based on the input parameters. In one embodiment, transform calculation module 236 may make further adjustments to transfer function 222 to account for the color boosting for the selected range of hues and the degree of boosting desired. Based on the input parameters, transform calculation module 236 may adjust transfer function 222 by going along corresponding transfer function curves for each color channel (e.g., RGB channels) so that the color balance between the color channels is maintained even after the color is boosted. Thus, the color may be proportionally enhanced (e.g., by increasing saturation value or brightness or luminance value) without changing the corresponding hue value or the corresponding color balance. This operation results in a different outcome from traditional boosting operations in which simply increasing the saturation component for a color results in the corresponding hue being changed and the color balance being modified.

At block 525, system 200 may display the color boosted image on display 250. Because of the color boosting and because of the user's adaptation to the low luminance white (e.g., brightness less than 100%), the image may be displayed with a perceptually wider dynamic range and gamut in color, even if even if no white level in the image may suggest this effect.

Figure 6:
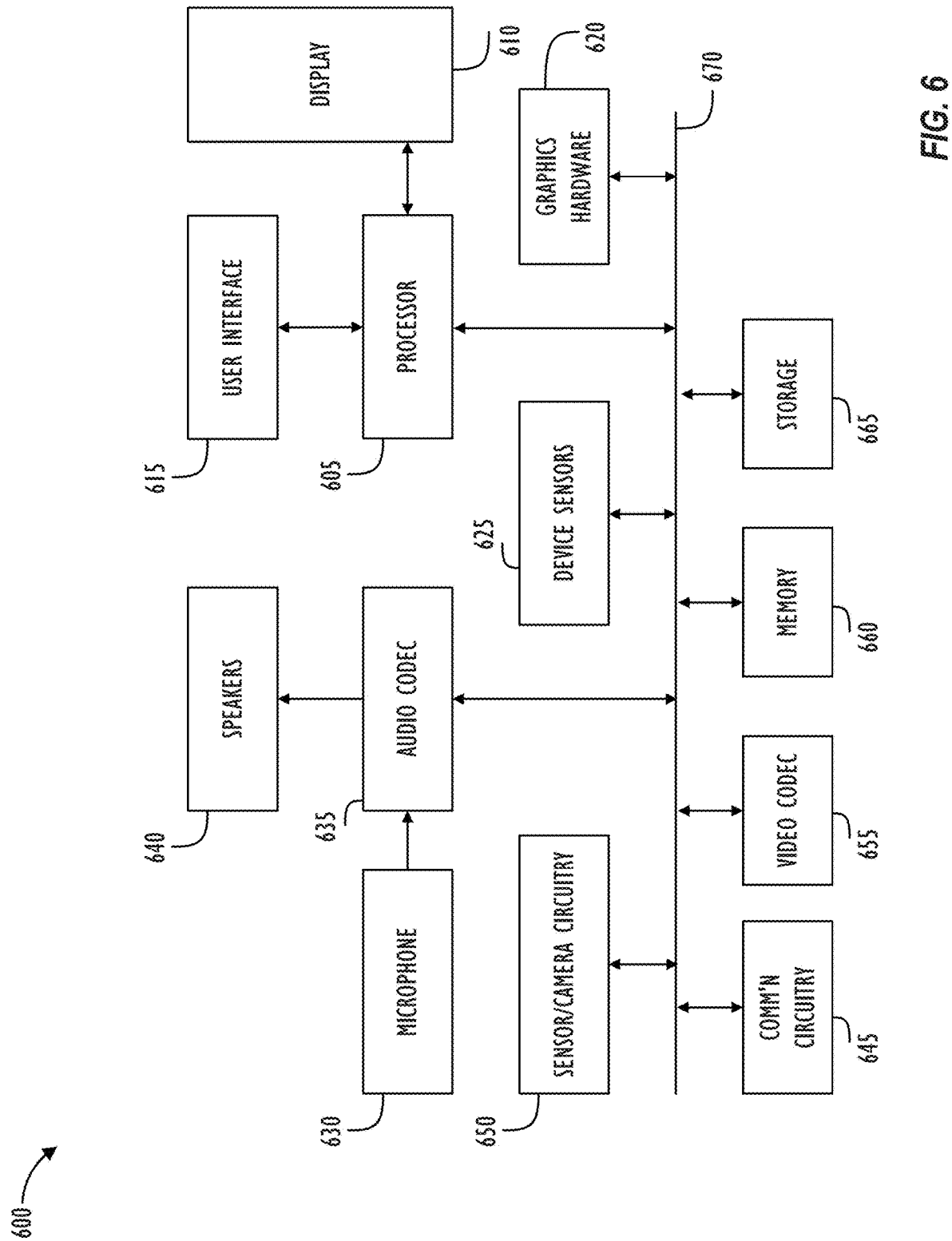
FIG. 6 is a simplified functional block diagram of an illustrative multi-functional electronic device.

Referring to FIG. 6, a simplified functional block diagram of illustrative device 600 that performs color rendering for images in EDR mode as described in FIGS. 2-5 is shown. Device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, sensor and camera circuitry 650, video codec(s) 655, memory 660, storage 665, and communications bus 670. Electronic device 600 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 600.

Processor 605 may execute instructions necessary to carry out or control the operation of many functions performed by a multi-functional electronic device 600 (e.g., such as color rendering for images in EDR mode). Processor 605 may, for instance, drive display 610 and receive user input from user interface 615. User interface 615 can take a variety of forms, such as a button, keypad, dial, a click wheel, keyboard, display screen and/or a touch screen. Processor 605 may be a system-on-chip such as those found in mobile devices and include a dedicated graphics-processing unit (GPU). Processor 605 may represent multiple central processing units (CPUs) and may be based on reduced instruction-set computer (RISC) or complex instruction-set computer (CISC) architectures or any other suitable architecture and each may include one or more processing cores. Graphics hardware 620 may be special purpose computational hardware for processing graphics and/or assisting processor 605 process graphics information. In one embodiment, graphics hardware 620 may include one or more programmable graphics-processing unit (GPU), where each such unit has multiple cores.

Sensor and camera circuitry 650 may capture still and video images that may be processed to generate images in accordance with this disclosure. Sensor in sensor and camera circuitry 650 may capture raw image data as red, green, and blue (RGB) data that is processed to generate an image. Output from camera circuitry 650 may be processed, at least in part, by video codec(s) 655 and/or processor 605 and/or graphics hardware 620, and/or a dedicated image-processing unit incorporated within camera circuitry 650. Images so captured may be stored in memory 660 and/or storage 665.

Memory 660 may include one or more different types of media used by processor 605, graphics hardware 620, and camera circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as compact disc-ROMs (CD-ROMs) and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

Figure 7:
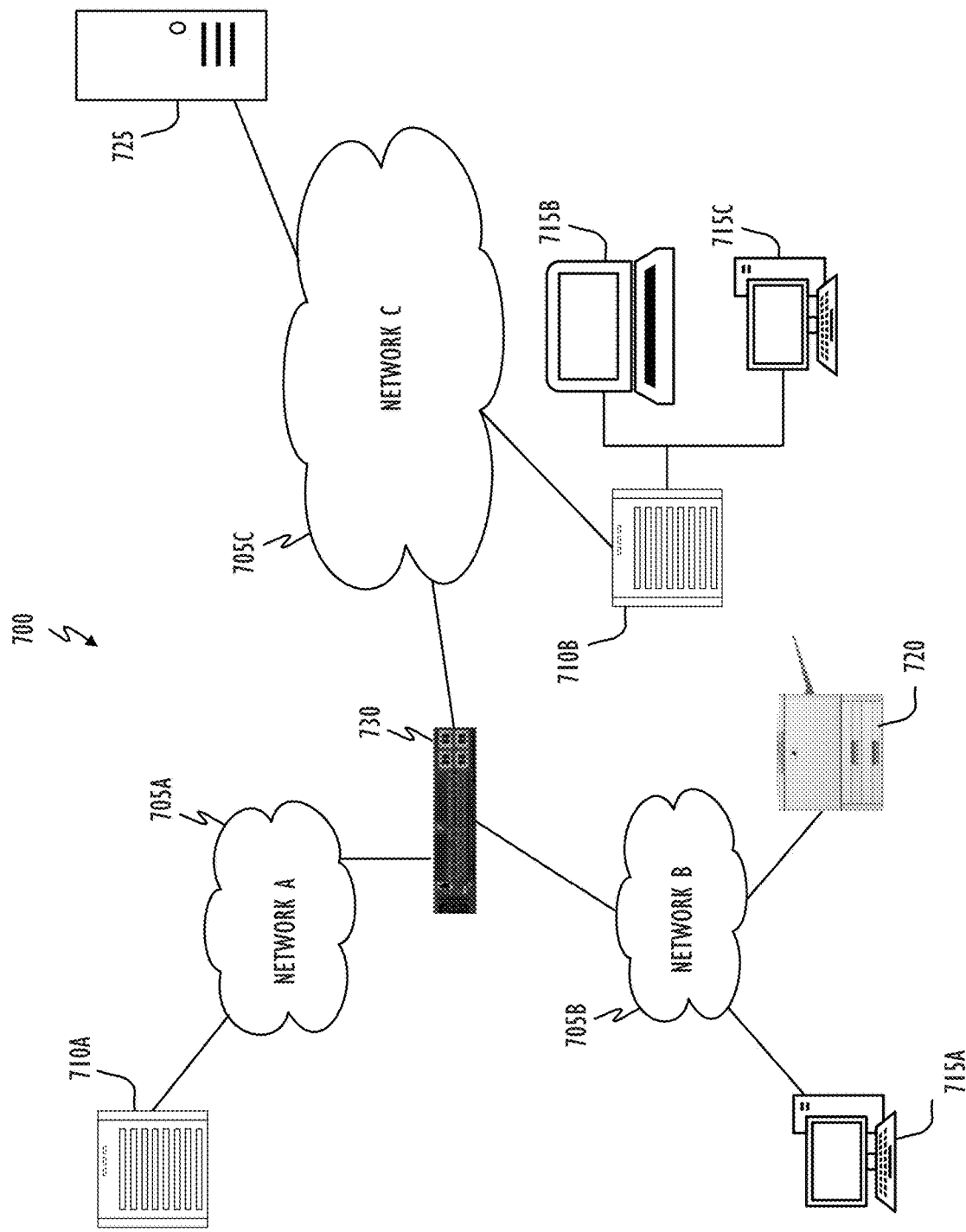
FIG. 7 shows, in block diagram form, a computer network, in accordance with one or more embodiments.

Referring to FIG. 7, illustrative network architecture 700 within which a system for performing color rendering for images in EDR mode in accordance with the disclosed techniques may be implemented includes a plurality of networks 705, (e.g., 705A, 705B and 705C), each of which may take any form including, but not limited to, a local area network (LAN) or a wide area network (WAN) such as the Internet. Further, networks 705 may use any desired technology (wired, wireless or a combination thereof) and communication protocol (e.g., TCP, or transmission control protocol and PPP, or point to point). Coupled to networks 705 are data server computer systems 710 (e.g., 710A and 710B) that are capable of communicating over networks 705. Also coupled to networks 705, and/or data server computer systems 710, are client or end-user computer systems 715 (e.g., 715A, 715B and 715C). Each of these elements or components may be a computer system or electronic device as described above with respect to FIGS. 1 and 6. In some embodiments, network architecture 700 may also include network printers such as printer 720 and network storage systems such as 725. To facilitate communication between different network devices (e.g., server computer systems 710, client computer systems 715, network printer 720 and storage system 725), at least one gateway or router 730 may be optionally coupled there between.

As used herein, the term "computer system" or "computing system" refers to a single electronic computing device or to two or more electronic devices working together to perform the function described as being performed on or by the computing system. This includes, by way of example, a single laptop, host computer system, wearable electronic device, and/or mobile device (e.g., smartphone, tablet, and/or other smart device).

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, than presented herein. More generally, if there is hardware support some operations described in conjunction with FIGS. 1, 4 and 7 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system comprising:
    a display panel;
    memory; and
    one or more processors operatively coupled to the memory and the display panel, wherein the memory comprises instructions that, when executed by the one or more processors, cause the one or more processors to:
        set a display mode for first image content responsive to a condition being satisfied;
        lower each of a plurality of pixel values of the first image content in response to setting the display mode such that the lowered plurality of pixel values of the first image content are mapped to a first color gamut, wherein the first color gamut is defined by a nominal range space and is lower than a native color gamut of the display panel, and wherein the native color gamut is defined by the nominal range space and an extended range space that is outside of the first color gamut;
        obtain a first parameter and a second parameter for the first image content; and
        perform a color boosting operation for, from among the lowered plurality of pixel values of the first image content in the nominal range space, each of first pixel values that meet the first parameter, wherein a color associated with each of the first pixel values is proportionally enhanced without changing a corresponding hue in the color boosting operation to utilize the extended range space of the native color gamut of the display panel,
    wherein the color boosting operation enhances, for each of the first pixel values that meet the first parameter, a corresponding saturation value while maintaining a corresponding color balance, and
    wherein a degree of enhancement of the color associated with each of the first pixel values in the color boosting operation is set based on the second parameter for the first image content.

2. The system of claim 1, wherein the condition is based on at least one of: a user setting operation, or an ambient light level of the display panel detected by a sensor.

3. The system of claim 1, wherein the first image content corresponds to content displayed within a first window on the display panel in the display mode.

4. The system of claim 1, wherein the instructions that, when executed by the one or more processors, cause the one or more processors to lower each of a plurality of pixel values of the first image content comprise instructions that, when executed by the one or more processors, cause the one or more processors to:
　lower each of the plurality of pixel values of the first image content based on a transfer function for a given color channel corresponding to the display mode.

5. The system of claim 1, wherein the first parameter defines, in the first image content, one of: (i) a hue; (ii) a range of hues; or (iii) a spatial or geometric range, for which the color boosting operation is to be performed.

6. The system of claim 5, wherein the spatial or geometric range corresponds to an object of interest within the first image content.

7. The system of claim 1, wherein the corresponding saturation value is enhanced in the color boosting operation based on an analytical function.

8. The system of claim 1, wherein the memory further comprises instructions that, when executed by the one or more processors, cause the one or more processors to animate the color boosting operation for each of the first pixel values so that the color associated with each of the first pixel values is enhanced in a plurality of steps over a predetermined period of time.

9. A method comprising:
　setting a display mode for first image content responsive to a condition being satisfied;
　lowering each of a plurality of pixel values of the first image content in response to setting the display mode such that the lowered plurality of pixel values of the first image content are mapped to a first color gamut, wherein the first color gamut is defined by a nominal range space and is lower than a native color gamut of a display panel, and wherein the native color gamut is defined by the nominal range space and an extended range space that is outside of the first color gamut;
　obtaining a first parameter and a second parameter for the first image content; and
　performing a color boosting operation for, from among the lowered plurality of pixel values of the first image content in the nominal range space, each of first pixel values that meet the first parameter, wherein a color associated with each of the first pixel values is proportionally enhanced without changing a corresponding hue in the color boosting operation to utilize the extended range space of the native color gamut of the display panel,
　wherein the color boosting operation enhances, for each of the first pixel values that meet the first parameter, a corresponding saturation value while maintaining a corresponding color balance, and
　wherein a degree of enhancement of the color associated with each of the first pixel values in the color boosting operation is set based on the second parameter for the first image content.

10. The method of claim 9, wherein the condition is based on at least one of: a user setting operation, or an ambient light level of the display panel detected by a sensor.

11. The method of claim 9, wherein the first image content corresponds to content displayed within a first window on the display panel in the display mode.

12. The method of claim 9, wherein lowering each of a plurality of pixel values of the first image content comprises:
　lowering each of the plurality of pixel values of the first image content based on a transfer function for a given color channel corresponding to the display mode.

13. The method of claim 9, wherein the first parameter defines, in the first image content, one of: (i) a hue; (ii) a range of hues; or (iii) a spatial or geometric range, for which the color boosting operation is to be performed.

14. The method of claim 13, wherein the spatial or geometric range corresponds to an object of interest within the first image content.

15. The method of claim 9, wherein the corresponding saturation value is enhanced in the color boosting operation based on an analytical function.

16. The method of claim 9, further comprising animating the color boosting operation for each of the first pixel values so that the color associated with each of the first pixel values is enhanced in a plurality of steps over a predetermined period of time.

17. A non-transitory program storage device, readable by one or more programmable control devices and comprising instructions stored thereon to cause the one or more programmable control devices to:
　set a display mode for first image content responsive to a condition being satisfied;
　lower each of a plurality of pixel values of the first image content in response to setting the display mode such that the lowered plurality of pixel values of the first image content are mapped to a first color gamut, wherein the first color gamut is defined by a nominal range space and is lower than a native color gamut of a display panel, and wherein the native color gamut is defined by the nominal range space and an extended range space that is outside of the first color gamut;
　obtain a first parameter and a second parameter for the first image content; and
　perform a color boosting operation for, from among the lowered plurality of pixel values of the first image content in the nominal range space, each of first pixel values that meet the first parameter, wherein a color associated with each of the first pixel values is proportionally enhanced without changing a corresponding hue in the color boosting operation to utilize the extended range space of the native color gamut of the display panel,
　wherein the color boosting operation enhances, for each of the first pixel values that meet the first parameter, a corresponding saturation value while maintaining a corresponding color balance, and
　wherein a degree of enhancement of the color associated with each of the first pixel values in the color boosting operation is set based on the second parameter for the first image content.

18. The non-transitory program storage device of claim 17, wherein the condition is based on at least one of: a user setting operation, or an ambient light level of the display panel detected by a sensor.

19. The non-transitory program storage device of claim 17, wherein the first image content corresponds to content displayed within a first window on the display panel in the display mode.

20. The non-transitory program storage device of claim 17, wherein the first parameter defines, in the first image content, one of: (i) a hue; (ii) a range of hues; or (iii) a spatial or geometric range, for which the color boosting operation is to be performed.

21. A system comprising:
 a display panel;
 memory; and
 one or more processors operatively coupled to the memory and the display panel, wherein the memory comprises instructions that, when executed by the one or more processors, cause the one or more processors to:
  set a display mode for first image content responsive to a condition being satisfied;
  lower each of a plurality of pixel values of the first image content in response to setting the display mode; and
  perform a color boosting operation, wherein the color boosting operation comprises increasing a saturation value of at least one color of pixel from among the lowered plurality of pixel values of the first image content, while maintaining a same hue value for the at least one color of pixel from among the lowered plurality of pixel values of the first image content.

22. The system of claim 21, wherein the condition is based on at least one of: a user setting operation, or an ambient light level of the display panel detected by a sensor.

23. The system of claim 21, wherein the lowered plurality of pixel values of the first image content are mapped to a first color gamut.

24. The system of claim 23, wherein the first color gamut is defined by a nominal range space and is lower than a native color gamut of the display panel.

25. The system of claim 24, wherein the native color gamut is defined by the nominal range space and an extended range space that is outside of the first color gamut.

* * * * *